United States Patent [19]

Yang

[11] E Re. 29,221

[45] Reissued May 17, 1977

[54] ACCELERATION SENSITIVE MOTION SNUBBER

[75] Inventor: Elmer Chensheng Yang, Orange, Calif.

[73] Assignee: Pacific Scientific Company, Anaheim, Calif.

[22] Filed: May 13, 1976

[21] Appl. No.: 685,949

Related U.S. Patent Documents

Reissue of:

[64] Patent No.: 3,876,040
Issued: Apr. 8, 1975
Appl. No.: 402,451
Filed: Oct. 1, 1973

[52] U.S. Cl. ..... 188/1 B; 248/54 CS
[51] Int. Cl.[2] ..... F16F 7/10
[58] Field of Search ..... 188/1 R, 1 B, 2 R, 129; 248/54 CS

[56] References Cited

UNITED STATES PATENTS

| | | | |
|---|---|---|---|
| 2,361,071 | 10/1944 | Vang | 188/1 B |
| 2,494,358 | 1/1950 | Rostoker | 188/1 B X |
| 2,838,137 | 6/1958 | Wallerstein | 188/1 B |
| 3,362,504 | 1/1968 | Maldarelli | 188/1 B |
| 3,532,187 | 10/1970 | Herring | 188/2 R |
| 3,623,574 | 11/1971 | Gardner | 188/1 R |
| 3,637,173 | 1/1972 | Suozzo | 248/54 CS |
| 3,741,867 | 6/1973 | Fortescue | 188/1 B X |
| 3,809,186 | 5/1974 | Suozzo | 188/1 B |

OTHER PUBLICATIONS

Mukai, S., IBM Technical Disclosure Bulletin, Torsion Bar Dampening Device, vol. 3, No. 10, Mar. 1961.

*Primary Examiner*—Duane A. Reger
*Attorney, Agent, or Firm*—Knobbe, Martens, Olson, Hubbard & Bear

[57] ABSTRACT

Relative axial movement of telescopically mounted support members is converted to rotation of an inertia mass by means of a ball-screw arrangement and a capstan spring loosely surrounding a portion of one of the support members. Slow acceleration of the inertia mass is accommodated, but rapid acceleration causes the inertia mass to lag which winds the capstan spring enough to grip one of the support members, which are rotationally fixed, and thereby snub movement until acceleration forces decrease. A spring band clutch positioned within the inertia mass and linked to the capstan spring ends enables the mass to slip in the event high velocity movement of the support members occurs and is then interrupted.

36 Claims, 4 Drawing Figures

ACCELERATION SENSITIVE MOTION SNUBBER

Matter enclosed in heavy brackets[ ] appears in the original patent but forms no part of this reissue specification; matter printed in italics indicates the additions made by reissue.

This invention relates to apparatus for preventing or snubbing rapid acceleration of an element while permitting slow acceleration. More particularly the invention is directed to an improved mechanical motion snubbing device.

In atomic energy electric generating plants, and similar facilities, there are many pipes carrying high pressure or high temperature fluids such as steam, water, sodium and other material. These pipes are supported and spaced from the walls or ceilings of a building or other surrounding support structure. In geographical areas where frequent earthquakes occur, there is serious concern that such pipes may rupture during an earthquake because of the rapid relative movement between the pipes and the rest of the building. Accordingly, there is a current requirement that snubbing devices be attached to the pipes and the adjacent support structure to prevent or dampen such rapid relative movement. During normal operation, the pipe must be able to expand and contract a considerable amount because of the changing temperature differentials, particularly during start up and shutdown of the facility. Hence, the snubber must permit this slow relative movement while preventing the rapid movement of the pipe caused by an earthquake. After snubbing rapid movement, the device must recover automatically to once more permit slow movement of the pipe in either direction relative to its surrounding support structure.

The snubber must of course be highly reliable for long periods of time because of the expense of providing access to repair or replace a malfunctioning snubber. Because of radiation, maintenance prevents a health hazard also. Moreover, the snubbing capability must remain ready at all times even though it may never be used. The failure of the snubber could of course result in a safety hazard and huge economic losses if a large power generating station should be shut down or destroyed.

The snubbers presently being used are primarily hydraulic. However, a major shortcoming of hydraulic snubbers is that the hydraulic fluid and the seals employed deteriorate after a period of time, particularly when subjected to radiation. The hydraulic fluid tends to become a rubbery substance while the seals lose their flexibility and become hard and ceramic-like. Servicing hydraulic units is therefore necessary and is expensive. Hence, a need exists for a reliable all mechanical snubber that will not deteriorate with time.

In accordance with the present invention, tubular or cylindrical members are mounted for axial reciprocation with respect to each other and the outer end of one of the members adapted to be connected to the pipe whose movement is to be snubbed and the outer end of the other support member is adapted to be connected to support structure such as the building from which the pipe is suspended or supported. Means are provided within the support members to translate relative axial movement of the support members into rotation of a rotatably mounted inertia mass. A resilient drive such as a capstan spring is connected to drive the inertia mass during slow acceleration; however, during rapid acceleration, the inertia mass will lag rotationally and tend to wind the spring. Winding of the spring reduces its diameter and causes it to grip an adjacent, rotationally fixed brake surface, such as a portion of one of the support members. Further acceleration of the support members is prevented while the spring is engaging the brake surface, although movement may continue. As soon as rotational force on the spring is interrupted, the inertia mass after having caught up with the carrier is free to be backed-off by the spring ends so that the spring will restore its usual diameter wherein it is free to drive the inertia mass. Consequently, the snubbing device is automatically restored to permit slow relative axial movement of one support member relative to the other which is necessary to accommodate normal slow acceleration of the element whose rapid movement is to be snubbed. Automatic restoration is a critical feature for reliable operation.

In a preferred arrangement of the invention the axial movement of the support members is translated to rotational movement by means of a high lead screw or a ball nut and screw combination wherein the screw or threaded shaft is fixed to rotate with a torque carrier, and the nut is fixed to the other support member. The member supporting the torque carrier has a cylindrical sleeve and a surrounding housing which define an annular space. The torque transfer carrier includes a cylindrical skirt which fits within the annular space and the capstan spring is located between the cylindrical skirt of the carrier and the sleeve. The inertia mass has a generally cup-shape and its cylindrical skirt portion also fits within the annular space between the carrier skirt and the surrounding housing. Preferably, the spring has a cylindrical configuration with a plurality of coils and the ends of the spring extend through a window formed in the carrier skirt to be connected to the inertia mass.

Since the inertia mass permits slow acceleration of the support members, continued slow acceleration of relative axial movement of the support members will result in sufficient velocity to damage the spring if the support members are then abruptly stopped. To solve this problem, a clutch band is interposed on the interior of the inertia mass to cooperate with the spring ends. The clutch will allow the inertia mass to slip if the carrier is abruptly stopped.

One of the primary features of the arrangement is its sensitivity of the capstan spring and inertia mass combination and the high mechanical advantage provided. For example, a mechanical advantage of 30,000 may be readily provided. Thus if the inertia mass starts to accelerate enough to produce, say, a one pound force on the capstan spring, the spring will grip its brake surface and can withstand a 30,000 pound force on the support members.

For a more thorough understanding of the invention, reference may be had to the following detailed description and drawings in which.

Figure 1:
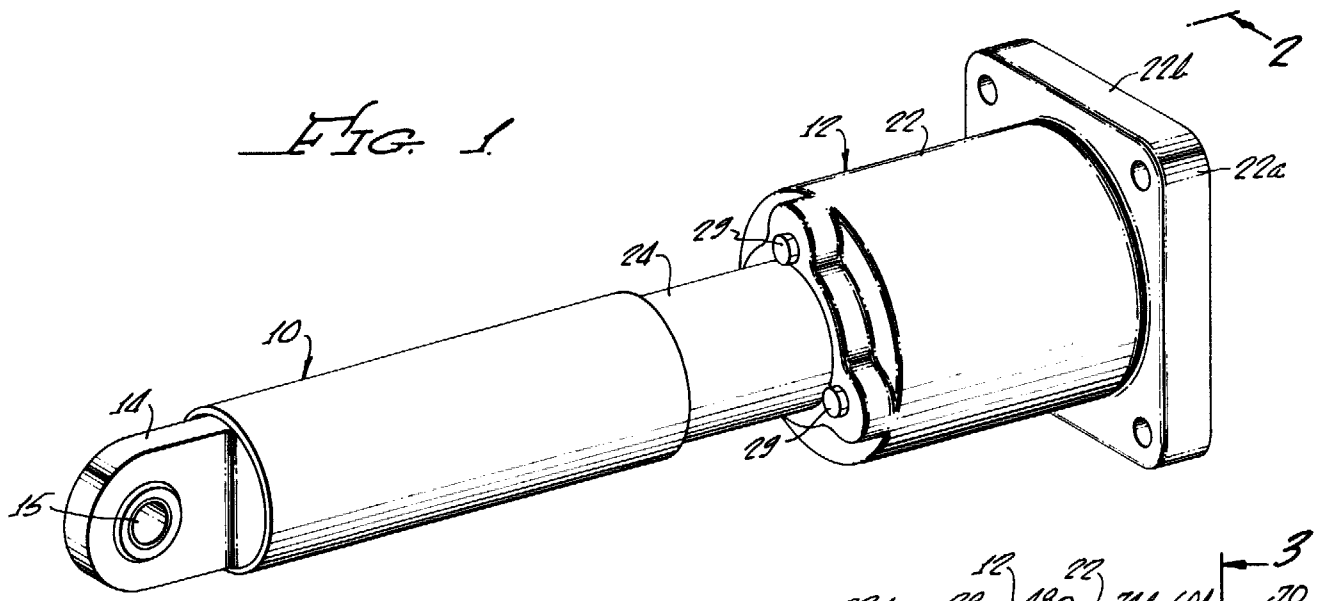
FIG. 1 is a perspective view of the exterior of the snubber of the invention.
Figure 2:
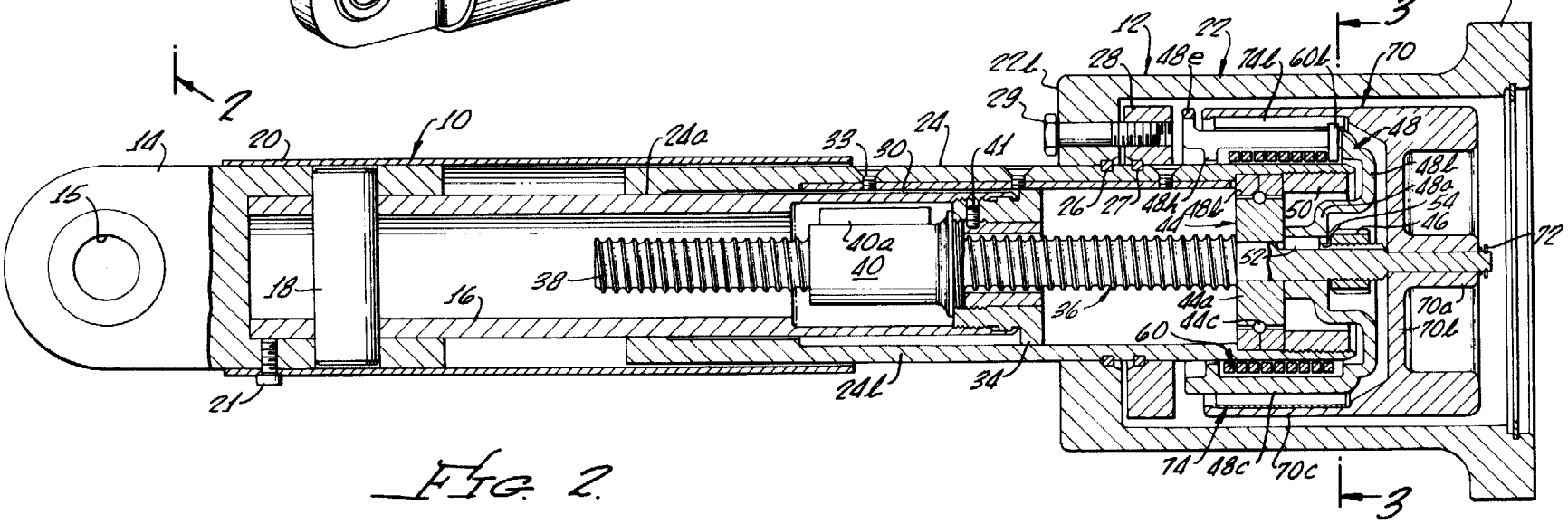
FIG. 2 is a longitudinal cross-section along the line 2—2 of FIG. 1.

Referring to FIGS. 1 and 2, the snubber includes a pair of support members generally indicated at 10 and 12, which are telescopically mounted on each other for relative axial reciprocation. For manufacturing convenience, the support members are formed of several components. The support member 10 includes a tongue member 14 having a hole 15 on its outer end for attachment to an item whose movement is to be snubbed, such as a fluid conducting pipe in a power generating system. A pin and clevis or other suitable means may be used for such connection. The inner end of the tongue 14 has a socket in which is positioned the end of an elongated supporting tube 16. The tube is secured to the tongue 14 and prevented from rotating with respect to the tongue by means of a large pin 18 which extends transversely through the tube and a transverse bore in the socket walls of the tongue 14. A tubular sleeve 20 surrounds a portion of the tongue and the tube 16 to retain the pin 18 in position and enclose the tube 16. The sleeve is retained on the tongue by means of a screw 21 or other suitable means.

The other main support member 12 includes a cup-shaped housing 22 having a large square flange 22a on its outer end for convenient attachment to a mating flange and possible extension structure leading to the building walls or other structure which will support the snubber. An elongated tube 24 extends into the closed end of the cup-shaped housing 24 and is secured to the housing by suitable means. In the arrangement illustrated, a retaining ring 26 fits partially within a mating annular groove in the exterior of the tube 24 and engages the end wall 22b of the housing 22 to prevent separation of the housing with respect to the tube in one axial direction. A similar retaining ring 27 spaced from the ring 26 fits partially within an annular groove in the exterior of the tube 24 and engages an enlarged collar 28, which is secured to the housing 22 by means of a plurality of bolts 29 extending through the end wall 22b of the housing and threaded into the collar. Thus this arrangement prevents movement of the housing 22 in the other axial direction with respect to the tube 24.

The left end of the tube 24 slidably fits over the tube 16 of the left support member so as to permit relative telescopic movement of the support members 10 and 12. The extreme left end of the tube 24 includes an inwardly facing land 24a that fits fairly snugly on the inner tube 16; however, the central portion 24b of the tube has a larger diameter and is thus spaced from the inner tube. An axially extending key 30 is positioned within this enlarged portion and attached to the wall of the tube by a plurality of screws 33. Thus the key 30 in effect forms a rib on the interior wall of the tube 24. A retaining nut 34 threaded into the end of the tube 16 has an outwardly extending flange which slidably fits within the enlarged portion of the tube 24. The diameter of the nut 34 is larger than the inner diameter of the land 24a on the left end of the tube 24 to prevent separation of the support members 10 and 12. The nut 34 has an axially extending slot which receives or fits over the key 30 to thereby prevent relative rotation of the support members 10 and 12.

To translate telescopic motion of the support members into rotation, there is provided a so-called ball-screw mechanism generally indicated as 36 within the tubes 16 and 24. This mechanism includes a screw shaft 38 having a continuous thread designed to receive a plurality of ball bearings which are confined within a housing 40 having a ball return track 40a which permits a series of balls to be cycled through the thread on the shaft. One end of the ball housing 40 is threaded into the retaining nut 34 and then locked to the nut by means of a set screw 41. The ball housing 40 is thus fixed to the inner tube 16.

The other end of the shaft 38 extends through a bearing 44 supported in the end of the tube 24. The shaft 38 is clamped to the inner race 44a of the bearing by means of a retaining nut 46 threaded onto the shaft. The nut also holds a torque carrier 48 mounted on the shaft with its hub 48a in engagement with the axial face of the bearing race 44a. The outer race 44b of the bearing 44 is mounted in an inner annular groove in the tube 24 and axially fixed to the tube by means of a cylindrical nut 50 threaded into the end of the tube 24. With this arrangement telescopic axial movement of the support members 10 and 12 will cause rotation of the shaft 38 and the inner race 44a of the bearing on the balls 44c of the bearing.

The torque carrier 48 is further fixed to rotate with the shaft 38 by means of a key 52 which fits within a suitable groove in the shaft and the torque carrier hub 48a. A lock element 54 also extends into the groove in the shaft and further cooperates with a groove in the nut 46 and is sandwiched between the torque carrier and the nut to prevent rotation of the nut once it has been threaded onto the shaft. The torque carrier has a generally cup-shape including an annular flange 48b which extends outwardly beyond the diameter of the tube 24 and further including a cylindrical portion or skirt 48c which surrounds the end of the tube 24 but is spaced from the tube so that it can easily rotate around the rotationally fixed tube. The torque carrier is formed with a window 48d in the cylindrical portion 48c, which window extends axially approximately the length of the cylindrical portion and extends radially about 15°, as may be seen from FIG. 3. A reinforcing strut 48e defines the end of the window on the open end of the cup-shaped torque carrier 48 to strengthen the structure. This is advantageous in the event it is desirable to form the carrier as a cast member.

Figure 3:
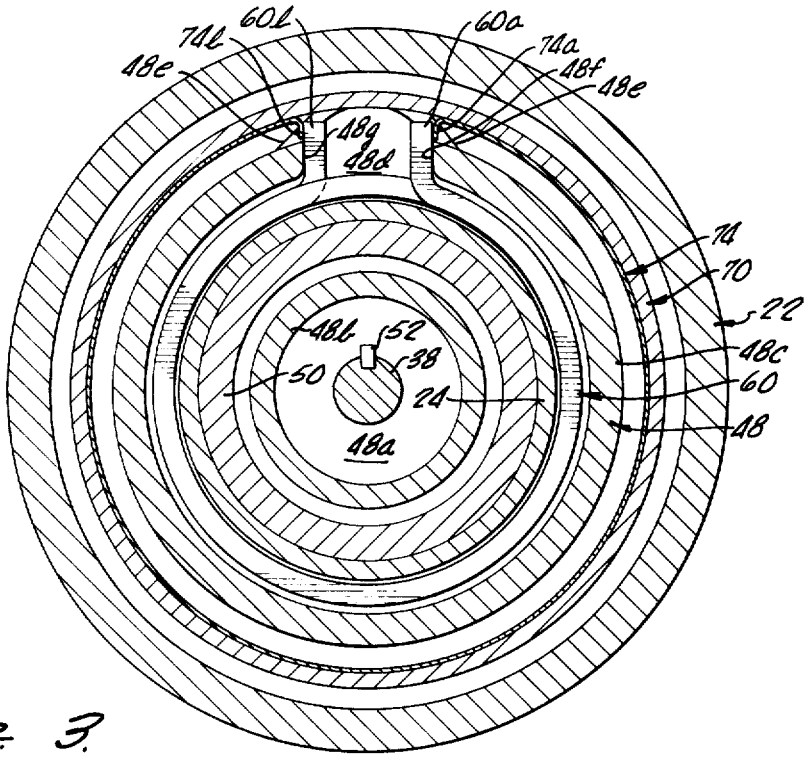
FIG. 3 is a cross-sectional view of the main portion of the snubber on line 3—3 of FIG. 2 showing the snubber in an unbraked condition.

As can be seen from FIGS. 2 and 3, an annular space is formed between the outer surface of the support tube 24 and the inner wall of the surrounding cylindrical portion 48c of the torque carrier. Positioned within this annular space is a capstan spring 60 which has a helical cylindrical configuration which normally loosely surrounds the tube 24. Clearance provided by 0.005 to 0.010 inches difference between the spring inside diameter and the tube outer diameter seems desirable. The spring has a plurality of turns or coils which preferably have a rectangular cross-section so that considerable spring surface area is facing the tube 24. The ends or tangs 60a and 60b of the spring 60 are bent to extend radially outwardly into the window 48d in the torque carrier, as can be seen in FIG. 3. The spring tangs 60a and 60b are of course axially spaced so that one tang is near one axial end of the window and the other tang is located near the other axial end. The spring ends are positioned circumferentially as shown in FIG. 3 with both ends within the single window 48d, with one tang 60a biased against one axially extending edge 48f of the window, while the other tang 60b engages the opposite axially extending edge 48g of the window. The spring 60 is axially confined within the torque carrier on one end by the flange 48b and on the other end by an inwardly extending annular rib 48h.

Positioned on the extreme right end of the shaft 38 is a cup-shaped inertia mass 70. The inertia mass has a central hub 70a which functions as a simple sleeve bearing for rotation of the inertia mass and axially retained on the shaft by means of a suitable retaining element 72. Extending outwardly from the hub 70a of the inertia mass is an end wall or flange 70b supporting a cylindrical section 70c. As can be seen, the outer or right end of the cylindrical section as viewed in FIG. 2 is of substantial size so as to provide considerable mass. The remaining portion of the cylindrical section 70c has a thinner wall and is spaced from and surrounds the cylindrical portion 48c of the torque carrier.

Biased against the interior surface of the cylindrical section 70c of the inertia mass is a thin walled spring clutch 74 which extends almost completely around the inner surface of the inertia mass. As can be seen from FIG. 3, the ends or tangs 74a and 74b of the clutch band are bent radially inwardly sufficiently far to be in the path of the spring tangs 60a and 60b. The clutch tangs are spaced from each other a circumferential distance equal to the width of the window 48d in the torque carrier to bracket and engage the tangs 60a and 60b of the capstan spring.

OPERATION

As has been briefly explained, one end of the snubber is attached to the element whose motion is to be snubbed and the other end is attached to a support structure. When used in a power generating station to snub the movement of fluid conducting pipes, the support member 10 is most conveniently attached to the pipe and the support member 12 is attached to the surrounding wall structure. The flange 22b of the support member 12 is suited for attaching to extension pipes or other links.

If an unbalanced axial force is applied to the snubber, such as might occur as a result of expansion or contraction of the pipe attached to the snubber, the support member 10 can move axially with respect to the support member 12. This axial movement however also moves the ball housing 40 of the ball-screw arrangement 36 which in turn rotates the screw shaft 38 and the torque carrier 48. Since the edges 48f and 48g of the window in the torque carrier engage the tangs of the spring 60, the spring is also rotated with the torque carrier. Further, since the tangs 60a and 60b of the spring engage the tangs 74a and 74b of the clutch band 74, it and the inertia mass 70 are also rotated. Thus, slow axial acceleration of one support member 10 relative to the other support member 12 is easily accommodated by the snubber. Note that the movement can occur in either direction since the ball-screw mechanism 36 operates in both directions and the spring in the inertia mass can also rotate in either direction.

If the support members 10 and 12 telescopically accelerate up to a predetermined threshold acceleration rate causing the inertia mass 70 to accelerate at its threshold rate, the inertia of the mass 70 will cause it to lag behind the torque carrier applying a drag force on one end of the spring 60.

Figure 4:
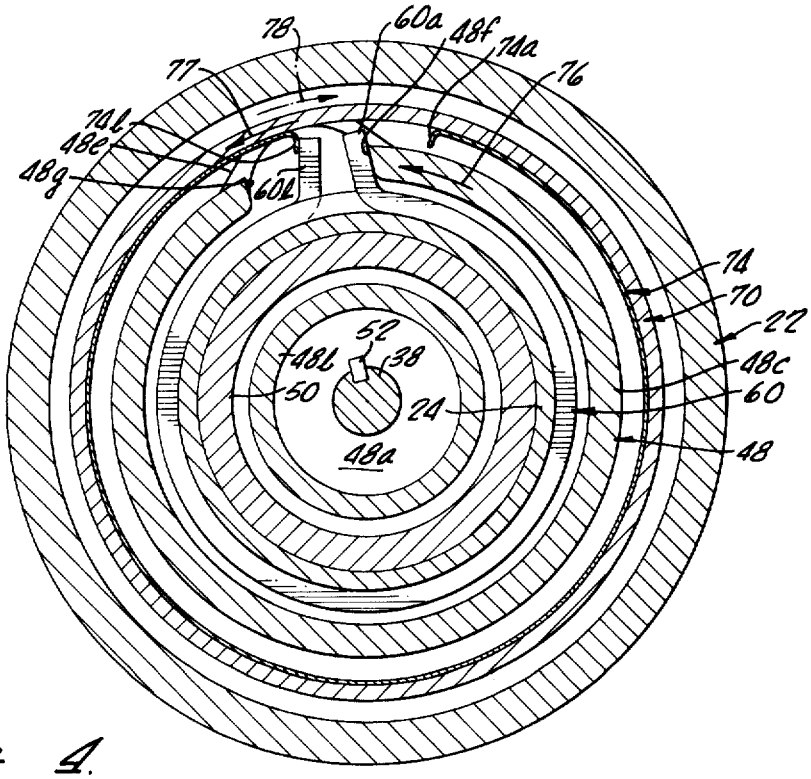
FIG. 4 is a cross-sectional view like that of FIG. 3, but showing the snubber in a braked condition.

In other words, referring to FIG. 4, if the torque carrier is moving in a counterclockwise direction as indicated by the arrow 76, its window edge 48f is applying a counterclockwise force to the spring tang 60a. The other tang 60b of the spring is transmitting this counterclockwise force on the clutch tang 74b and hence on the inertia mass 70 also in a counterclockwise direction, as shown by the arrow 77. However, due to the inertia of the mass 70, it does not move as quickly as the torque carrier with the result that a spring winding force is applied to the spring 60. This condition is shown in FIG. 4 where the spring end 60b engaging the clutch end 70b is closer than in FIG. 3 to the spring end 60a which has moved away from the clutch tang 74a. Applying a winding force to the spring reduces its diameter a slight amount so that it grips the exterior surface of the rotationally fixed tube 24, thus providing a braking or governing force. In effect, the spring coils form a brake shoe and the exterior surface of the fixed tube 24 forms a brake drum.

As a result of this braking action, acceleration of the torque carirer 48 and the shaft 38 is limited to a predetermined threshold rate. This in turn limits axial movement of the ball housing 40 and the tube 16 to which it is attached. In other words, the relative telescopic acceleration of the support members 10 and 12 is limited or governed to a predetermined rate, but telescopic movement can continue if the telescoping force continues. Once the force trying to produce the telescopic acceleration ceases, the force trying to produce angular acceleration of the torque carrier and the spring also ceases, and the inherent bias of the spring 60 will cause its ends to revert back to their normal position shown in FIG. 3, rotating the inertia mass a slight amount in the process. Thus, the braking force produced by the spring is completely abated.

It should also be noted that while the movement has been described above by rotating the torque carrier in one direction, the brake or governing mechanism functions in a similar manner if the telescopic support members are moved in a manner to cause the torque carrier to move in the opposite direction. That is, a winding force is still applied to the spring if the inertia mass lags the torque carrier. The internal difference is that the window edge 48g engages the tang 60b of the capstan spring and the tang 60a engages the clutch tang 74a during the spring winding operation and the tang 74b of the clutch band is spaced from the spring tang 60b during this operation.

Thus, it can be seen that the snubber is uniquely adapted to quickly limit movement caused by alternating rapid forces such as that which might occur during an earthquake and yet continues to accommodate slow telescopic movement of the snubber support members. When earthquake forces subside the mechanism returns to its original condition. The brake mechanism of the snubber is ready to function at any time even though it remains unused for many years.

The fact the mechanism does not actually stop movement, but permits slow acceleration even under continued application of high force is very important in some circumstances. Normally when a pipe is urged to move by, say forces caused by temperature changes, the pipe hangars readily permit such movement, and the present invention plus prior art snubbers will accommodate such movement. However, in some instances, pipe hangars or other support structures may bind and not permit movement until the pipe wants to move, say, an inch or two, and hence the force is larger. If the snubber employed quickly locked upon sudden movement and farther movement could not occur until the force subsided allowing the snubber to unlock, the force could continue and possibly result in a pipe rupture.

The snubber of this invention, however, would, as stated, permit continued movement, although at a slow acceleration rate. Thus the high pipe moving force would be accommodated and the pipe rupture would be avoided.

The snubber of the invention is very sensitive to acceleration forces and can accommodate large axial forces due to its high mechanical advantage. That is, due to the ball-screw mechanism and the braking surface area produced by the capstan spring 60, the spring can be wound into its locking mode with a very small winding force applied to the spring ends, and yet the braking force can be extremely high. For example, in one experimental version of the snubber the ball-screw mechanism provides a mechanical advantage of thirty times while the capstan spring arrangement provides a mechanical advantage of about a thousand for a total of thirty thousand. Consequently, a very small braking force introduced by the inertia mass on the capstan spring can accommodate a very large axial force that might be introduced during an earthquake. Thus, the device is very sensitive to acceleration forces and yet is easily and quickly unlocked to return to normal. Since the device is so sensitive, the inertia mass never really rotates during earthquake forces but instead simply oscillates a bit so that the spring ends do not have to accommodate much momentum. That is, the acceleration is snubbed almost immediately; and since the earthquake forces usually oscillate, there is no significant velocity.

Since the snubber is not responsive to velocity, it is possible to telescope the support members from one extreme position to the other extreme position under a slow but constant acceleration, with the result that a significant velocity could be developed on the torque carrier and the inertia mass. That is, the device would not brake because there was no rapid acceleration and hence no lagging of the inertia mass. This condition would normally not occur in the environment of a power generating station, because pipes would usually expand and contract at such an acceleration rate that they would not develop a significant velocity; and during an earthquake, movement of that type does not arise. Nevertheless, a mechanic installing the device might subject it to such forces. If so, the support members 10 and 12 would abruptly stop on reaching the end of their travel and the inertia mass, by then operating at a significant velocity, would have considerable momentum, with the result that a significant force would be applied to the ends of the spring were it coupled directly to the inertia mass, and such momentum force could damage the spring tangs 74a and 74b. The clutch band 74 is provided to accommodate such forces and to prevent damage to the spring ends. That is, the clutch band 74 is designed to permit the inertia mass to slip relative to the band when a predetermined relative force is obtained. This force will not damage the spring 60 but is greater than that which the spring ends would ever be subjected to during a rapid acceleration operation. Thus during movement of the type occurring during earthquake, the inertia mass would simply move with the clutch spring, and the mechanism would operate as if the clutch and inertia mass were a single unit.

Repeating the clutch operation in greater detail, the components would appear as shown in FIG. 3 with the inertia mass moving at relatively high velocity and slow acceleration. When the torque carrier is abruptly stopped, the inertia mass would continue to rotate, initially, continuing to carry the clutch spring 74. Thus the clutch spring would drive one tang of the capstan spring towards the other tang which would be held stationary by the window edge in the torque carrier. This winding spring movement would be limited by the tube 24. This condition is shown in FIG. 4, if it is assumed that the torque carrier is stationary and the inertia mass is moving in the direction of the broken arrow 78. The clutch has been stopped by the capstan spring, and the mass can continue to travel till stopped by friction of the clutch band.

What is claimed is:

1. A motion snubbing device comprising:

a pair of members mounted for relative movement with respect to each other; and acceleration sensitive means connected to said members for limiting movement of either of the members relative to the other member in either of two opposite directions to a predetermined threshold acceleration rate *while permitting continued relative movement at said threshold and* including means for preventing operation of said limiting means below said predetermined acceleration thus permitting repeated or continuous relative movement below said predetermined threshold both before and after said predetermined acceleration has been reached.

2. The device of claim 1 wherein said acceleration sensitive means includes:

brake means for restricting said relative movement and an inertia mass connected to sense the acceleration of said relative movement and to actuate said brake means so as to prevent acceleration beyond said threshold rate.

3. A motion snubbing device comprising:

a pair of members mounted for relative movement with respect to each other; and acceleration sensitive means connected to said members for limiting the relative movement of the members to a predetermined threshold acceleration rate, said acceleration sensitive means including a torsion spring loosely surrounding a brake surface and an inertia mass connected to be driven by the relative movement of said members through said torsion spring in a manner such that rapid acceleration of the inertia mass in either of two opposite directions causes said inertia mass to lag with respect to the driving force producing a winding force on said spring causing it to grip the brake surface to limit acceleration of said members.

4. The device of claim 1 wherein said members are mounted to reciprocate with respect to each other.

5. The device of claim 4 wherein said members comprise a telescopically movable strut.

6. The device of claim 5 wherein said acceleration sensitive means includes a rotatably mounted inertia mass, means for converting telescopic movement of the strut into rotation of the inertia mass in a manner to enable the mass to lag in its movement when the telescoping acceleration of said strut reaches said threshold, and brake means responsive to said lagging to limit the acceleration at said threshold rate.

7. A device for snubbing rapid pipe movement in a power generating station that might be caused by sudden forces such as that occurring during an earthquake, the device comprising:

a pair of support members mounted to reciprocate on each other while being restrained from relative rotation;

a rotatably mounted torque carrier;

means for translating relative axial movement of said support members into rotation of said carrier;

a rotatably mounted inertia mass;

a brake surface positioned inwardly from the torque carrier; and spring means positioned within said carrier loosely surrounding said brake surface, said spring means being connected to the carrier and the inertia mass in a manner to cause the spring and the inertia mass to rotate with the carrier during slow acceleration of the carrier, while during rapid acceleration, the inertia mass lags the carrier causing the spring diameter to be reduced so that it grips the brake surface and locks the carrier, and thereby locks the support members.

8. The device of claim 7 wherein said spring means has a generally cylindrical configuration with a plurality of turns which surround the brake surface and extend along the brake surface so as to provide considerable gripping area on the brake surface.

9. The device of claim 8 wherein the ends of said spring engage the torque carrier and the inertia mass to cause the torque carrier to drive the inertia mass.

10. The device of claim 9 wherein said torque carrier has a cylindrically shaped portion with a window formed therein and the ends of said spring extend through said window, the spring ends normally engaging opposite edges of the window, said spring ends being connected to said inertia mass in a manner such that when the inertia mass lags behind the carrier the inertia mass causes the spring ends to be moved in a spring winding direction thereby causing the spring to grip the brake surface.

11. The device of claim 10 including clutch means positioned within said inertia cooperating with the spring ends so that the inertia mass is driven through the clutch means.

12. The device of claim 7 including clutch means positioned within said inertia mass to normally rotate with the inertia mass, said clutch means connecting the inertia mass to said spring means such that if the inertia mass is subjected to high velocity and the support members are suddenly stopped, the inertia mass will slip with respect to the clutch means and the spring means so as not to damage the spring means.

13. The device of claim 12 wherein said inertia mass has an inwardly facing cylindrical surface and said clutch means comprises a band of spring material having a generally cylindrical shape confined within the inertia mass to engage the inner cylindrical surface of the inertia mass due to the spring force of the clutch material, said clutch band extending considerably around the interior surface of the inertia mass but terminating in a pair of circumferentially spaced, inwardly extending flanges adapted to cooperate with said spring means.

14. The device of claim 7 wherein said support members are generally cylindrically shaped members, said carrier is a cup-shaped member rotatably mounted on one end of one of the support members, said spring is positioned between said one support member and said torque carrier, and said inertia mass is a cup-shaped member enclosing the torque carrier, the spring ends extending through a window in the torque carrier to co-operate with the inertia mass.

15. A device for snubbing rapid acceleration of one element relative to another comprising:

a pair of telescoping support members to be connected between a support surface and the object whose movement is to be snubbed;

an inertia mass rotatably mounted with respect to the support members while being axially fixed; and means for converting relative axial movement of the support members into rotation of the inertia mass including a capstan spring surrounding a brake surface with the ends of the spring connected to drive the inertia mass, the connection between the spring and the inertia mass permitting limited relative movement so that rapid acceleration applied to the inertia mass will cause it to lag and wind the spring causing the spring to grip the brake surface, while slow acceleration will be accommodated.

16. The device of claim 15 wherein a capstan spring surrounds one of the support surfaces and the brake surface is the exterior of that support member.

17. A device for snubbing rapid movement of one element relative to another comprising:

a pair of support members mounted to reciprocate on each other while being restrained from relative rotation;

a torque carrier rotatably mounted within one of said support members while being axially fixed;

means connecting said carrier and the other support member in a manner to translate relative axial movement of said support members into rotation of said carrier;

an inertia mass rotatably mounted adjacent a portion of said carrier;

a capstan spring mounted to rotate in response to rotation of said carrier;

a brake surface positioned within said capstan spring closely spaced from the spring, such that a reduction in diameter of the spring causes the spring to grip the brake surface and prevent the carrier from rotating; and the ends of said spring being connected to said inertia mass in a manner such that slow rotational acceleration of the carrier will cause the inertia mass to move with the carrier whereas during rapid acceleration of the carrier the inertia mass will lag behind the carrier and thus wind the spring causing it to grip momentarily the brake surface and thus prevent relative axial movement of said support members.

18. An acceleration sensitive device for snubbing motion when it reaches a predetermined acceleration threshold, comprising:

a brake surface;

a rotationally mounted inertia mass;

spring means surrounding the brake surface and being connected to drive said inertia mass for slowly accelerating movement in either of two opposite directions while rapid acceleration causes the inertia mass to lag and apply a force on the spring means causing it to grip the brake surface.

19. The device of claim 18 including a rotationally mounted torque carrier surrounding said brake surface and wherein said spring is positioned between the brake surface and the torque carrier and includes a plurality of coils normally loosely surrounding the brake surface, said spring having a pair of end tangs which extend outwardly through a window in the torque carrier to cooperate with the inertia mass, the spring being rotated by the torque carrier through the engagement of the window edges with the spring tangs.

20. The device of claim 19 including a pair of support members mounted to reciprocate on each other and means for converting such reciprocation to rotation of the torque carrier.

21. The device of claim 18 including clutch means connecting the spring means to the inertia mass permitting the mass to slip with respect to the spring when subjected to force greater than the force needed to cause the spring to grip the brake surface.

22. A device for snubbing rapid pipe movement in a power generating station that might be caused by sudden forces such as that occurring during an earthquake, the device comprising:

a cup-shaped housing having its closed end adapted to be connected to the pipe or to a support structure;

an elongated tube extending partially into the open end of the housing spaced from the surrounding housing to define an annular space with the housing, the open end of the housing being fixed to the outer periphery of the tube;

a cylindrical support member mounted for axial movement with respect to the tube, means for preventing relative rotation between the tube and the support member, the support member being adapted to be attached to either the pipe or adjacent support structure;

threaded means fixed to the support member;

a torque carrier rotatably mounted on thrust bearings supported on the inner end of the tube positioned within the housing;

a shaft fixed to said carrier and threaded through said threaded means such that unbalanced axial forces on said support member and said housing will cause rotation of the shaft and hence permit axial movement of the support member relative to the housing;

said carrier including a flange which extends radially beyond the free end of said tube and a cylindrical skirt which extends into said annular space between the housing and said tube;

a cup-shaped inertia member positioned in said housing rotatably mounted on said carrier coaxially with the carrier, said inertia member including a cylindrical skirt which is positioned in said annular space between the carrier skirt and the surrounding housing;

a clutch band positioned within the cylindrical skirt of the inertia member said clutch band extending partially around the inner circumference of the inertia member skirt terminating in a pair of spaced opposed flanges which extend towards the carrier skirt, said band being made of springy material biased to tightly engage the interior of the inertia member skirt while permitting rotational slippage between the band and the surrounding skirt; and a capstan spring positioned between said carrier skirt and said tube with the ends of the spring extending through the carrier skirt and into the space between said clutch band flanges; said carrier skirt having a window through which said spring ends extend, said window and the spaced clutch band flanges permit limited winding and unwinding of the spring caused by relative rotation between the carrier and the inertia member, the contruction of the spring being such as to cause the spring to normally engage the interior surface of the carrier skirt spaced slightly from the exterior of said tube so that the spring is free to move with the carrier during slow rotational acceleration whereas rapid acceleration will cause the inertia member to lag behind the drum thereby restraining the spring ends to wind the spring and cause it to reduce its diameter and to grip the tube and hence limit the rate of rotation of the carrier which in turn limits the rate of relative axial movement between the support member and the housing.

23. A method of snubbing rapid acceleration of a fluid conducting pipe in a power generating station as might occur during an earthquake, while permitting slow movement of the pipe, comprising:

applying the accelerating movement of the pipe to a support structure by means of a pair of support members mounted for reciprocation relative to each other; and converting the reciprocal movement of the support members into rotation of an inertia mass driven by a capstan spring loosely surrounding a brake surface, such as the exterior of one of the support members in a manner such that the inertia of the inertia mass winds the capstan spring causing it to grip the brake surface when the capstan spring is rapidly accelerated.

24. A device for snubbing rapidly accelerating movement comprising:

a pair of members mounted for relative movement; acceleration sensitive means connected to said members for limiting the relative movement of the members to a predetermined acceleration including resilient brake means and an inertia mass connected to be driven by the relative movement of said members through said resilient brake means in a manner such that attempted rapid acceleration of the inertia means in either of two opposite directions causes said inertia mass to lag with respect to the driving force and produce a force on said resilient brake means causing it to limit acceleration of said members.

25. The device of claim 24 wherein said resilient brake means is self-restoring to a nonbraking condition as soon as the force produced by the lagging inertia mass ceases whereby relative movement between said members can continue in either of said directions.

26. The device of claim 24 wherein said brake means is a coil spring which grips a braking surface to provide braking action.

27. The combination comprising:

a supporting structure in a power generating station;

a pipe supported by said support structure;

a pair of members mounted for relative movement with respect to each other, one of said members being connected to one of said pipes and the other of said members being connected to said support structure; and means connected to said members for limiting the relative movement of the members to a predetermined threshold acceleration while permitting *further* relative movement of said members *under continued application of a substantial amount of the force applied to said members in reaching* [ at acceleration rates below ] said threshold.

28. The device of claim 27 wherein said members are telescopically mounted with respect to each other to form a strut connected between said pipe and said support structure.

29. A motion snubbing device comprising:

a strut having two members mounted for movement relative to the other to be connected between the structures whose relative movement is to be snubbed;

an inertia mass which is rotatably mounted and axially fixed;

means connecting said inertia mass to be rotated by relative movment of said strut members in a manner such that the inertia mass can lag rotationally with respect to the force rotating it; and means responsive to a predetermined amount of said lagging for limiting the relative movement of said strut members to a predetermined acceleration.

30. A method of automatically snubbing the motion of pipes in a power generating station relative to the structure supporting the pipes such as the surrounding building, comprising the steps of:

connecting a strut formed of two relatively movable members between one of said pipes and said support structure;

sensing the relative acceleration of said members; and preventing [relative motion] *acceleration* above a predetermined acceleration threshold, while permitting [unrestricted] *further relative* motion [below the threshold] *of said members under continued application of force applied to the members in reaching said threshold.*

31. The method of claim 30 wherein:

said sensing step includes converting the relative movement of said members into movement of an inertia mass through a resilient connection in a manner such that the movement of the inertia mass will lag with respect to the relative movement of said members; and said preventing step includes utilizing the lagging of said inertia mass to restrict relative movement of said members to said predetermined threshold acceleration.

32. The method of claim 31 wherein said resilient connection is a spring surrounding a braking surface and the lagging of said inertia mass causes the spring to tighten on the braking surface when said predetermined accleration is reached and thereby restrict said relative movement.

*33. A motion snubbing device comprising:*

*a pair of support members mounted to reciprocate on each other while being restrained from relative rotation;*

*a rotatably mounted torque carrier;*

*means for translating relative axial movement of said support members into rotation of said carrier;*

*a cylindrical brake surface concentrically positioned adjacent said carrier; and*

*means including an inertia mass and a torsion producing spring connected to rotate with said carrier in a manner to sense the relative acceleration of said carrier and to cooperate with said brake surface to limit said acceleration to a predetermined threshold.*

*34. The device of claim 33 wherein said spring is connected to said carrier to drive said inertia mass, the spring permitting said inertia mass to lag the movement of the carrier, said lagging movement being utilized to initiate braking action with respect to said brake surface.*

*35. A motion snubbing device comprising:*

*a pair of support members mounted to reciprocate on each other while being restrained from relative rotation;*

*a rotatably mounted torque carrier;*

*means for translating relative axial movement of said support members into rotation of said carrier;*

*a brake surface positioned adjacent to said carrier; and*

*means including an inertia mass and a spring connected to said carrier to drive said inertia mass, the spring permitting said inertia mass to lag the movement of the carrier at a predetermined acceleration, said lagging movement being utilized to initiate braking action with respect to said brake surface.*

*36. A motion snubbing device comprising:*

*a pair of support members mounted to reciprocate on each other while being restrained from relative rotation;*

*a rotatably mounted torque carrier;*

*means for translating relative axial movement of said support members into rotation of said carrier;*

*brake means; and*

*means for sensing the relative acceleration of said carrier to initiate action of said brake means to limit said acceleration to a predetermined threshold, the accuracy of said sensing and brake initiating action being independent of frictional losses in said translating means.*

* * * * *